(12) United States Patent
Aniban, Jr.

(10) Patent No.: US 8,388,760 B2
(45) Date of Patent: Mar. 5, 2013

(54) PORTABLE ONE MAN ROOT POISONING SYSTEM FOR SEWERS

(76) Inventor: Raymond Aniban, Jr., Ewa Beach, HI (US)

( * ) Notice: Subject to any disclaimer, the term of this patent is extended or adjusted under 35 U.S.C. 154(b) by 184 days.

(21) Appl. No.: 11/665,612

(22) PCT Filed: Nov. 15, 2004

(86) PCT No.: PCT/US2004/038421
§ 371 (c)(1),
(2), (4) Date: Apr. 16, 2007

(87) PCT Pub. No.: WO2006/054984
PCT Pub. Date: May 26, 2006

(65) Prior Publication Data
US 2008/0105319 A1    May 8, 2008

(51) Int. Cl.
*B08B 9/027* (2006.01)

(52) U.S. Cl. ............... 134/22.11; 134/24; 134/168 C; 137/899.4; 138/93

(58) Field of Classification Search .......... 137/899.4; 15/302, 340.1; 134/168 C, 24, 22.11; 138/89, 138/93
See application file for complete search history.

(56) References Cited

U.S. PATENT DOCUMENTS

| | | | | |
|---|---|---|---|---|
| 1,760,750 A | * | 5/1930 | Goodman | 138/93 |
| 2,273,984 A | * | 2/1942 | Osborn | 138/90 |
| 2,927,609 A | * | 3/1960 | Vanderlans | 138/93 |
| 3,075,535 A | * | 1/1963 | Lasting | 134/167 C |
| 3,453,869 A | * | 7/1969 | Cherne | 73/40.5 R |
| 3,636,862 A | * | 1/1972 | Bottas et al. | 100/45 |
| 3,874,926 A | * | 4/1975 | Horne et al. | 134/24 |
| 3,892,588 A | * | 7/1975 | Horne | 134/24 |
| 4,011,100 A | * | 3/1977 | Ross | 134/8 |
| 4,025,360 A | * | 5/1977 | Horne et al. | 134/24 |
| 4,082,567 A | * | 4/1978 | Conklin et al. | 134/10 |
| 4,083,384 A | * | 4/1978 | Horne et al. | 138/93 |
| 4,337,096 A | * | 6/1982 | Clifford | 134/8 |
| 4,458,721 A | * | 7/1984 | Yie et al. | 138/93 |
| 4,690,305 A | * | 9/1987 | Copeland | 222/52 |
| 4,811,869 A | * | 3/1989 | Tremblay | 222/440 |
| 4,883,094 A | * | 11/1989 | Vetter | 138/89 |
| 4,981,524 A | * | 1/1991 | Waite | 134/24 |
| 5,165,434 A | * | 11/1992 | Tobiason | 134/113 |
| 5,213,120 A | * | 5/1993 | Dickson | 134/102.1 |
| 5,361,512 A | * | 11/1994 | Tobiason | 34/60 |
| 5,503,188 A | * | 4/1996 | Petrone | 138/93 |
| 5,546,991 A | * | 8/1996 | Mathison et al. | 138/93 |

(Continued)

*Primary Examiner* — John K Fristoe, Jr.
*Assistant Examiner* — Marina Tietjen (57) ABSTRACT

An Improved system for killing roots in sewers without stopping the existing sewer flow, a portable system to eliminate the roots in the sewers, this system makes it possible to treat the roots by treating only the zone concerned and not the overall length of the drain of sewer. The invention enters the sewer by an opening and travels to the problem and inflates in order to retain the poison dispensed by the dispenser. This system makes it possible to more easily deal with problems of roots in the sewers more quickly and, which makes it possible to reduce the cost. All the zones touched by problems of roots can be treated, treatment limits the progression of the roots and destroys them, which makes it possible to prevent the over flow of sewers and the damage of the drains of sewers. The prevention of overflows of sewers makes it possible to protect our wild, aquatic life and our water supply. Basically to help save our environment.

14 Claims, 8 Drawing Sheets

U.S. PATENT DOCUMENTS

| | | | |
|---|---|---|---|
| 5,735,955 A * | 4/1998 | Monaghan et al. | 118/317 |
| 5,771,937 A * | 6/1998 | Collins | 138/93 |
| 5,785,090 A * | 7/1998 | VanderLans | 138/89 |
| 5,901,752 A * | 5/1999 | Lundman | 138/93 |
| 5,988,188 A * | 11/1999 | Born | 134/22.11 |
| 6,135,157 A * | 10/2000 | Conklin, III | 138/89 |
| 6,959,734 B2 * | 11/2005 | Lundman | 138/93 |
| 7,073,535 B1 * | 7/2006 | Warmerdam | 138/93 |
| 7,357,146 B2 * | 4/2008 | Beaty | 137/172 |
| 7,455,077 B2 * | 11/2008 | Lundman | 138/93 |

* cited by examiner

PORTABLE ONE MAN ROOT POISONING SYSTEM FOR SEWERS

CROSS-REFERENCE TO RELATED APPLICATION

The present application is a national stage of International Application No: PCT/US04/38421 filed Nov. 15, 2004.
Safety Plug and Bypass
Osborn, U.S. Pat. No. 2,273,984 February 1942
Temporary Plug for Pipes
Vanderlands, U.S. Pat. No. 2,927,609 April 1957
Apparatus for Flushing Extraneous Matter from Clogged Drain Pipes
Lasting, U.S. Pat. No. 3,075,535 Jan. 29, 1963
Method of Killing Roots and Organic Growths in Sewer Pipes
Horne, U.S. Pat. No. 3,892,588 July 1975
Pipe Cleaning Method and Apparatus
Ross U.S. Pat. No. 4,011,100 March 1977
Method and Apparatus for Injecting Foam into a Pipe, Including an Inflatable Plug
Horne, U.S. Pat. No. 4,083,384 April 1978
Method and Implement for Cleaning Drains
Cliffor, U.S. Pat. No. 4,337,096 June 1982
Pipeline Flow Restrictor
Yie, U.S. Pat. No. 4,458,721 July 1984
Apparatus for Applying Dry Herbicides to Flora Infestation within Sewer Lines
Tobison, U.S. Pat. No. 5,165,434 April 1978
Method and Apparatus for Generating Foam within a Pipe
Dickson, U.S. Pat. No. 5,213,120 May 1993
System for Applying Herbicides to Flora Infestation within Sewer Lines
Tobiason, U.S. Pat. No. 5,361,512 November 1994
Pipeline Stopper Plug and Method Therefore
VanderLans, U.S. Pat. No. 5,785,090 July 1998
Method and Apparatus to Remove Obstructions from Sewers without Cutters and Chemicals
Born, U.S. Pat. No. 5,988,188 November 1999
Method of Filling the Interior of Pipes
Conklin, U.S. Pat. No. 6,135,157 October 2000
Inflatable Flow Control Apparatus and Associated Method
BEATY, U.S. Pat. No. 7,357,146 B2 May 2008
Sewer Treatment to Kill Tree Roots and Other Organic Growth Therewithin:
Horne U.S. Pat. No. 3,741,807 Jun. 26, 1973
Apparatus for Generating and Dispersing Foam Herbicide within a Sewer:
Monaghan, U.S. Pat. No. 5,735,955 April 1998
Powder Dispenser;
Tremblay, U.S. Pat. No. 4,811,869 March 1989
Solid Block Chemical Dispenser for Cleaning System;
Copeland, U.S. Pat. No. 4,690,305 September 1987
Method and Apparatus for Injecting Foam into a Pipeline, Including an Inflatable Plug;
Horne, U.S. Pat. No. 4,025,360 May 1977
Pipelining Apparatus
Huff, U.S. Pat. No. 3,606,862 September 1971

BACKGROUND

1. Field of Invention

This invention relates to a method for treatment of killing of root growth in sewers and under ground pipes specifically and improved method of treatment.

2. Description of the Prior Art

While working for the C&C of Honolulu for more then 10 years, I've realized how threatening roots are to our sewer system and the amount of sewer spills, pipe damage, legal fees and the endangerment of our environment. I realized the methods that are used lack certain objections so I came up with an idea that would be able to not only treat roots in all areas of the sewer system, but also a cost effective method that could be used on a daily bases and achieve what other prior art may lack.

Originally previously used methods of treating roots in sewer pipes ignore the use of using the existing flow of sewer water to transport a root chemical to the specific zone without disrupting the flow of sewer water, where roots has intruded and restrict the chemical from flowing past the specific zone.

Numerous methods of treating roots in sewers have been provided, but they seem to require large equipment or a means of blocking the natural flow of sewer water, and treating large sections of pipe, which don't necessarily need treatment. By using my invention a specific zone of 1 ft or more from a single entrance such as a residential cleanout passing through the lateral and to the mainline, which needs to be treated without stopping the existing flow of the sewer water with a minimal amount of chemical. By using the exiting gravity flow of the sewer water to transport an activated root killing chemical to a specific zone, which is then brought to maturity by foaming to a greater height reaching the top of the sewer pipe within that zone, this system is also designed to travel to multiple concerned area's using one application of chemical. This method may also eliminate the mechanical method used to temporally remove root concerns, when used on a preventive maintenance schedule All prior art suffer from a variety of disadvantages a) In Horne's theory (U.S. Pat. No. 3,741,807 filed Jun. 26, 1973)

FIG. 3 to 11 shows that it would be very time consuming being that a line would need to be drawn from one entrance of a sewer pipe to another then the sled would need to be pulled to the zone to which treatment is desired. If a second entrance of sewer pipe is not permissible, which in many cases it's not, then Horne's theory could not be used. Horne also claims to spay and soak the entire sewer line from one entrance to the other.

b) Huff, (U.S. Pat. No. 3,606,862)

Huff claims 1. Apparatus for applying coating material to the interior wall of a pipe comprising:

A generally cylindrical applicator head for applying the coating material to the pipe wall, having a diameter smaller than the internal diameter of the pipe, said applicator head being adapted to traverse the length of the pipe in one direction and to receive the coating material under pressure through a supply connected thereto;

With all due respect for Huff's invention, the invention is related to Horne being that a moving device travels though a pipe and sprays the inner walls. In Huff's Abstract he discloses an apparatus to line pipes, lining is used to rehabilitate a pipe, meaning to reinforce the existing pipe from future malfunction. Furthermore Huff doesn't mention applying a root chemical to treat roots in a pipe, nor does he claim a restrictor.

While my method is to use the velocity of the existing sewer flow to transport the root chemical to a desired location once it is brought to a consistency to travel to where the chemical restrictor is positioned, without disrupting the existing sewer flow c) Monaghan, (U.S. Pat. No. 5,735,955)

Monaghan, in claim 22. "The apparatus according to claim 13 wherein the nozzle sprays in a substantially 360. degree circumference".

With all due respect for Monaghan's invention, I believe the invention is related to Horne and Huff being that a moving device travels though a pipe and sprays the inner walls. While again my method is to use the velocity of the existing sewer flow to transport the root chemical to a desired location once it is brought to a consistency to travel to where the chemical restrictor is positioned.

b) Tremblay (U.S. Pat. No. 4,811,869)

Tremblay claims "A powder dispensing device comprising a powder container, he does mention a window for the view of a scale of measurement, but doesn't mention a restrictor to restrict a root chemical.

d) Copeland (U.S. Pat. No. 4,690,305)

Copeland claims "A means for dispensing a concentrated aqueous chemical solution from a solid block of a wash chemical to a utilization point, which comprise" but doesn't mention a restrictor to restrict a root chemical.

e) Horne (U.S. Pat. No. 4,025,360) injects the root chemical and also needs to enter through a sewer manhole.

f) Other methods of removing roots require a mechanical method which uses uses cutters as a plumber would use a snake to clear a blockage, but this method is a temporary solution being that roots grow faster and thicker once they are mechanically removed.

g) Another method is used to treat roots, requires activating a chemical outside of the sewer pipe then dumping the matured chemical directly into the entrance of a sewer pipe which makes it difficult to travel long distances, and requires the entire length of pipe to be treated from one entrance to another to determine if the chemical has reached from one point to the other. This is very costly if there is only one root problem in a 300 ft sewer pipe. Although various methods have been described above through experience and research prior patents are not used today for treating roots in sewer pipes.

With all due respect to the inventors and their patents mentioned above, they all seem to lack the uses of the existing gravity flow to transport the root chemical under the roots and containing it in a specific zone.

SUMMARY OF THE INVENTION

The invention relates to a portable non-disruption of sewer flow system to eliminate the roots in the sewers, this system making it possible to treat the zones touched by problems of roots by treating only the zone concerned and not the overall length of the drain of sewer. The system according to the invention penetrates in the sewer by an opening for cleaning, travels to the zone, which poses problems and inflates in order to retain the poison applied by the applicator. This system makes it possible to more easily deal with the problems of roots in the sewers more quickly which makes it possible to reduce the costs. All the zones touched by problems of roots can be treated, the treatment limits the progression of the roots and destroys them, which makes it possible to prevent the overflows of sewers and the damage of the drains of sewers. The prevention of the overflows of sewers makes it possible to protect the environment, in particular the wildlife, the aquatic life, the supply water, and to avoid the closing of beaches, lakes, etc. In a general way, this system contributes to preserve the environment.

OBJECTS AND ADVANTAGE

Besides the objects and advantages of the Root Treatment System, as described in the above patent, several objects and advantages of the present invention are:

(a) To provide a one step method root treatment system that will target a specific zone of sewer pipe using the minimal amount of root chemical, equipment, time and cost without disrupting the normal flow of sewer water. Previous methods are unsuccessful and possibly eliminated the mechanical step of removing these roots.

(b) To provide a root treatment system that will allow an activated root chemical to travel under intruding roots, to a distance in a sewer pipe using the gravity flow of sewer water to a specific zone then, have the chemical mature and work its way in the opposite direction of sewer flow and coat the entire root or roots where previous methods are unsuccessful.

(c) To provide a root treatment system that will confine the matured chemical in that confined space allowing the chemical to reach the top of larger pipes using my restrictor would contain the chemical in a zone causing a head and have the restrictor travel through the sewer pipe should the whole length of pipe need treatment where previous methods are unsuccessful.

(d) Further objects and advantages are to provide a root treatment system that will minimize the cost of treating roots in the sewer system, which cause sewer spill's that endangers our environment and water supply, the damage of sewer pipes which is costly to municipalities as well as homeowners and possibly replace the dangerous method previously used. Furthermore, preventing sewer spills, this invention may also prevent the closing of lakes, rivers and beaches and endangering plants, wildlife and aquatic life and protecting our environment and water supply.

BRIEF DESCRIPTION OF THE SEVERAL VIEWS OF THE DRAWINGS

FIG. 16 shows a side sectional view of the top section of the chemical dispenser in operation with water on.

| Reference Numeral In Drawing | |
|---|---|
| 1 | expandable restrictor |
| 3 | chemical dispenser |
| 5 | wheel |
| 7 | wheeled carriage |
| 9 | carriage handle |
| 10 | reel |
| 11 | revolving reel |
| 13 | reel axle |
| 15 | distance meter |
| 16 | wheeled carriage hanger |
| 17 | air supply line |
| 19 | ferule |
| 21 | safety cable |
| 22 | restrictor safety cable |
| 23 | flanged sleeve |
| 24 | restrictor safety cable washer |
| 25 | male air supply line connector |
| 27 | swiveled female air line connector |

-continued

| Reference Numeral In Drawing | |
|---|---|
| 29 | distant marker |
| 31 | grace airline |
| 33 | air tank |
| 35 | air tank pressure gauge |
| 37 | air tank fill valve |
| 39 | air lank manifold |
| 41 | regulator |
| 43 | air fill valve |
| 45 | air flow meter |
| 47 | pressure gauge |
| 49 | pressure release valve |
| 51 | dummy restrictor |
| 53 | water tank |
| 55 | water tank fill cap |
| 57 | water tank air entrance and water exit cap |
| 59 | water tank manifold |
| 61 | water tank regulator |
| 63 | water tank air fill valve |
| 65 | water tank air flow meter |
| 67 | water tank pressure gauge |
| 69 | pressure release valve |
| 70 | air supply line to water tank |
| 71 | water supply line |
| 73 | splitter |
| 74 | water supply line to dispenser |
| 75 | free water supply line |
| 77 | water on/off valve |
| 79 | expandable bladder |
| 81 | non expandable bladder sleeve |
| 83 | sealed Plug |
| 84 | plug cap |
| 85 | opened plug |
| 86 | sled |
| 87 | zip ties |
| 89 | protective braking bag |
| 91 | stretchable band |
| 93 | adjustable strap |
| 95 | bag tie |
| 97 | zipper |
| 99 | agitator |
| 101 | parachute |
| 103 | screen |
| 105 | shield |
| 106 | nozzle |
| 107 | scale window |
| 109 | lid |
| 111 | chemical dispenser extension |
| 113 | chemical dispenser bottom cap |
| 115 | dispenser stand |
| 117 | dispenser connectors |
| 119 | dispenser hanger |
| 123 | root chemical |
| 120 | aperture |
| 121 | drop line |
| 125 | activated chemical |
| 127 | matured chemical |
| 129 | sewer cleanout |
| 131 | sewer pipe |
| 133 | sewer manhole |
| 135 | connection to garden hose |
| 137 | water |
| 139 | sewer water |
| 141 | roots |
| 143 | tank mounting bracket |
| 145 | garden hose |
| 147 | root cutting equipment |
| 149 | other type of restrictor |
| 151 | other chemical dispenser |
| 153 | restrictor tag line |
| 155 | individual buoyant embodiment |

DETAILED DESCRIPTION OF THE INVENTION

Figure 1:
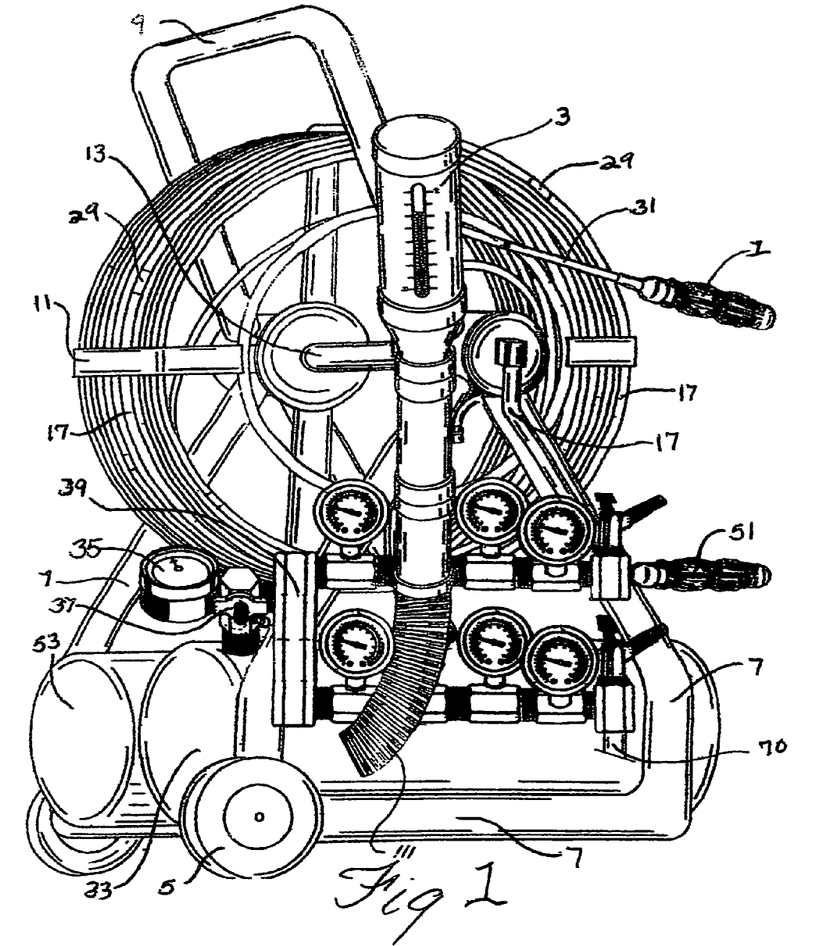
FIG. 1 shows a view of a portable non-disruption of sewer flow root treatment system for sewers that is fully equipped with all resources available.
Figure 2:
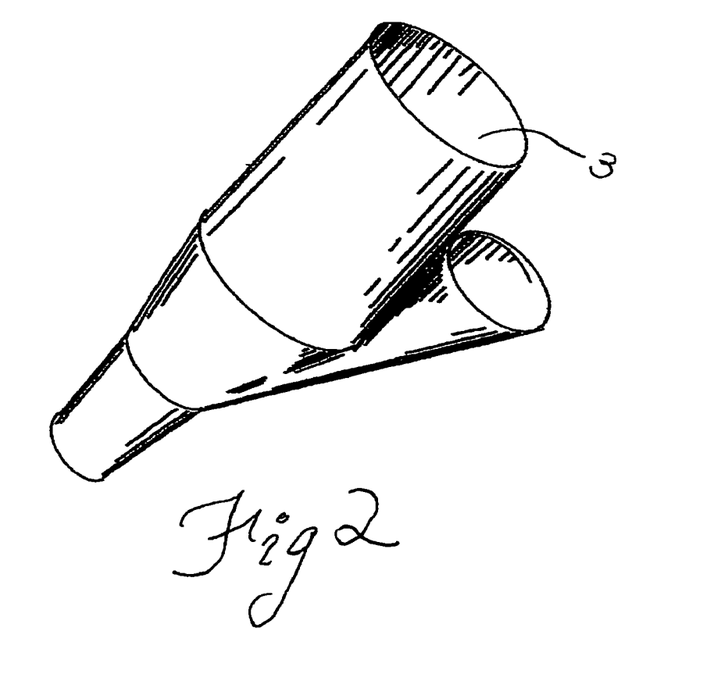
FIG. 2 shows a view of a basic two part individual portable non-disruption of sewer flow root treatment system for sewers.

The portable root treatment system is illustrated in FIGS. 1, 2. The portable root treatment system consist of a wheeled carriage 7, as shown in FIG. 2, for transportation of the root treatment system, which consist of a revolving reel 11, as shown in FIG. 2 for the storage of an air supply line 17, as shown in FIGS. 2, 5, 6, 7, 21, 23, 24, 25.

Figure 5:
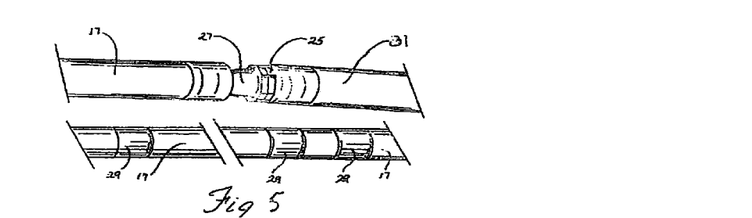
FIG. 5 shows a view of the air supply line with connectors and distant markers.
Figure 6:
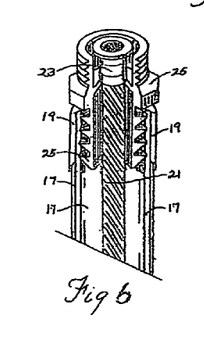
FIG. 6 shows a side sectional view of the connection of a male connector to the air supply line.
Figure 7:
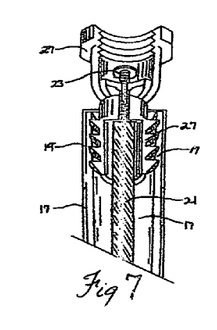
FIG. 7 shows a side sectional view of the connection of a female connector to the air supply line.

The air supply line 17, consist of a flexible but firm conduit able to travel the needed distance in sewer pipes, which is equipped with a safety cable 21, within the air supply line 17, as shown in FIGS. 6,7. A male air line connector 25, and a swivel female air line connector 27, is connected to each end of the air supply line 27, as shown in FIGS. 6,7, distant markers 15, are located along the length of the air supply line 17 as shown in FIGS. 2, 5.

Figure 3:
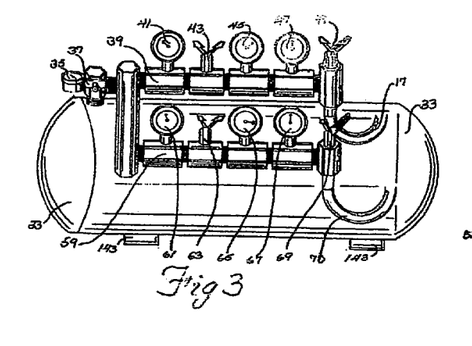
FIG. 3 shows a view of the air tank with manifolds and gauges.
Figure 12:
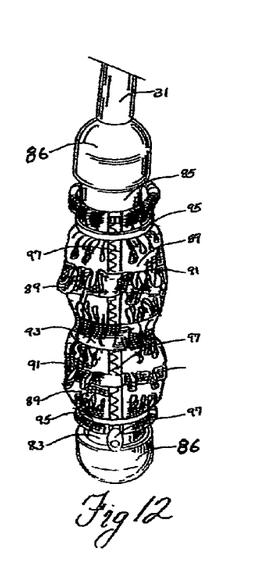
FIG. 12 shows a view of the expandable restrictor unexpanded with a protective braking bag.

An air tank, air compressor or air pump 33, is mounted to the wheeled carriage 7, using tank mounting bracket 143, air tank 33, has a connection to a air tank manifold 39, as shown in FIGS. 2, 3. The air tank manifold 39, consist of a regulator 41, an air fill valve 43, an air flow meter 45, a pressure gauge 47, a pressure release valve 49, a dummy restrictor 51. The air tank manifold 39, has a connection to one end of the air supply line 17, and the other end of the air supply line 17, connected to the reel axle 13, as shown in FIGS. 3,12.

Figure 17:
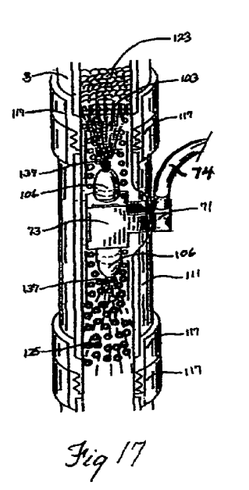
FIG. 17 shows a side sectional view of the lower section of the chemical dispenser in operation and dispensing the activated chemical.

A source of water or a water tank 53, is mounted to the wheeled carriage 7, using tank mounting bracket 143, a water tank manifold 59, consist of a water tank regulator 61, a water tank air fill valve 63, a water tank air flow meter 65, a water tank pressure gauge 67, a water tank pressure release valve 69. The air supply line to water tank 70, is connected from water tank manifold 59, to the water tank 33, which provides water pressure to the water supply line 71, which is connected to a chemical dispenser 3, as shown in FIG. 17.

Figure 8:
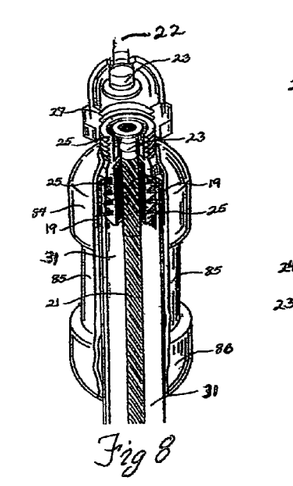
FIG. 8 shows a side sectional view of the open plug connected to the grace airline.
Figure 11:
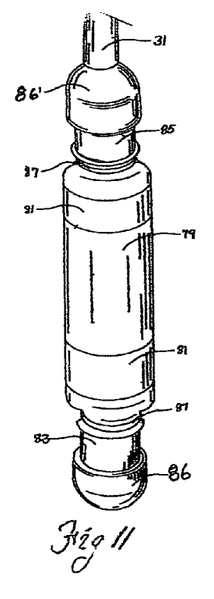
FIG. 11 shows a view of both open and sealed plug connected to the expandable bladder connected.

An expandable bladder 79 as shown in FIG. 11, is an expandable and retractable material such as surgical rubber, one end of the a bladder 79 is closed with a sealed plug 83, which is sealed with a sled 86, at the farthest end of the sealed plug 83, and the other end is closed with an opened plug 85, The open plug 85, has both ends opened for the passage of the grace air line 31, and male air line connector 25, as shown in FIG. 8.

Figure 9:
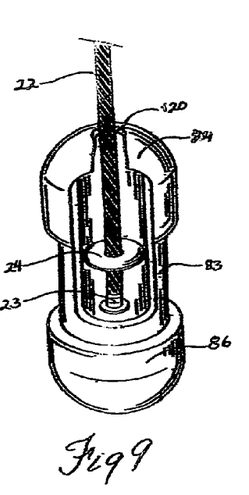
FIG. 9 shows a side sectional view of the sealed plug connected to the restrictor safety cable.
Figure 10:
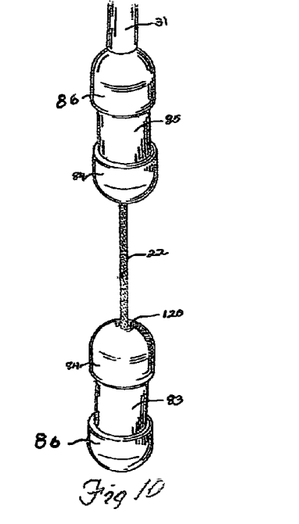
FIG. 10 shows a side view of the two plugs in connection by the restrictor safety cable.

The sealed plug 83, and opened plug 85 is connected with a restrictor safety cable 22, and swiveled female airline connector 27, as shown in FIG. 10. The grace air line 31, has a safety cable 21, having a male air supply line connector's 25, at the opened plug 85, and a swiveled female air line connector 27, at the other end as shown in FIGS. 8, 9. The expandable bladder 79, is secured both plugs by zip ties 87, as shown in FIG. 11.

Figure 13:
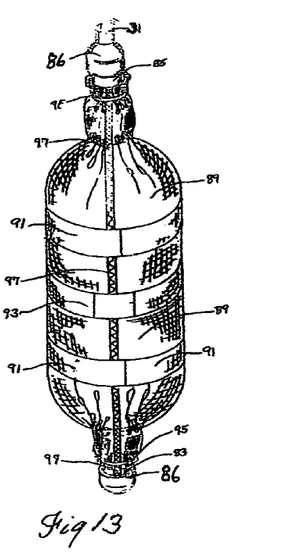
FIG. 13 shows a view of the expanded restrictor.
Figure 25:
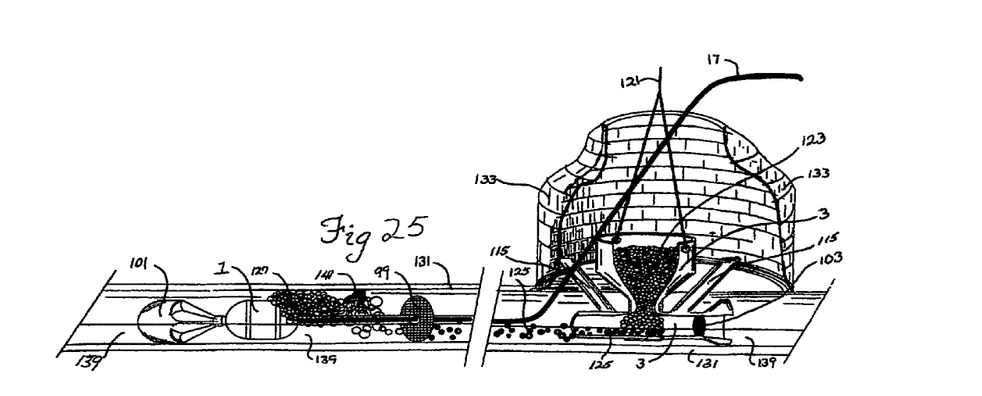
FIG. 25 shows an underground side sectional view of a treatment done from a manhole using a parachute to help transport the restrictor to the specific zone for long distances. And using the existing sewer water flow, to activate and transport the activated chemical to the desired zone, using the agitator to enhance maturity.
Figure 26:
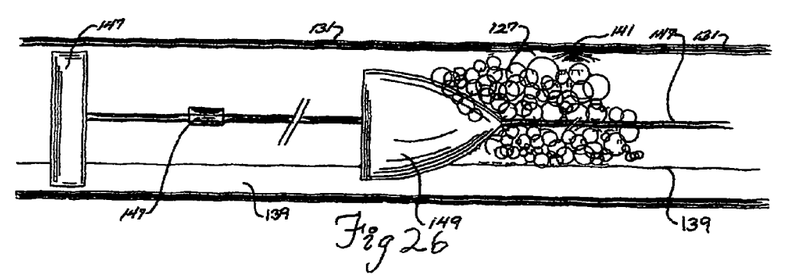
FIG. 26 shows an underground side sectional view of a main sewer line, being treated immediately after the mechanical method of removing roots have been preformed, by attaching a restrictor to sewer equipment that can travel through the sewer system.
Figure 27:
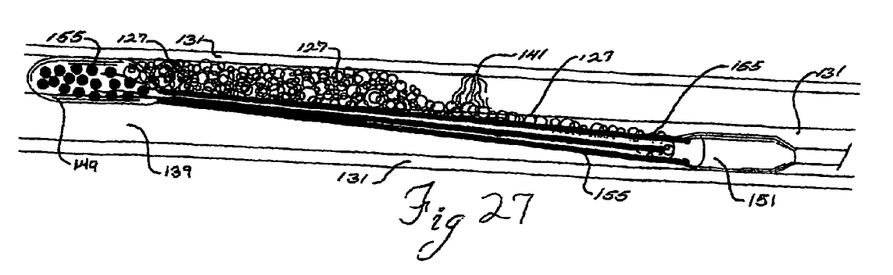
FIG. 27 shows an underground side sectional view of a large sewer line being treated, using a previously used dispenser with a restrictor, using the restrictor to contain the chemical between the restrictor and the dispenser.

A protective braking bag 89, made of a durable material has at least one stretchable band 91, made of rubber or elastic and an adjustable strap 93, made of Velcro, is sewed to the protective braking bag 89. The bag tie 95, is placed at both ends of protective braking bag 89, and a zipper 97, along the length of the protective braking bag 89, as shown in FIGS. 12,13. The restrictor can be made of a variety of material's and of many shape's that will restrict just the foam of the root chemical 125, and not the sewer flow. An agitator 99, and a parachute 101, may be connected to the air supply line 17, or the sled 86, as shown in FIG. 25.

Figures 18, 19, 20:
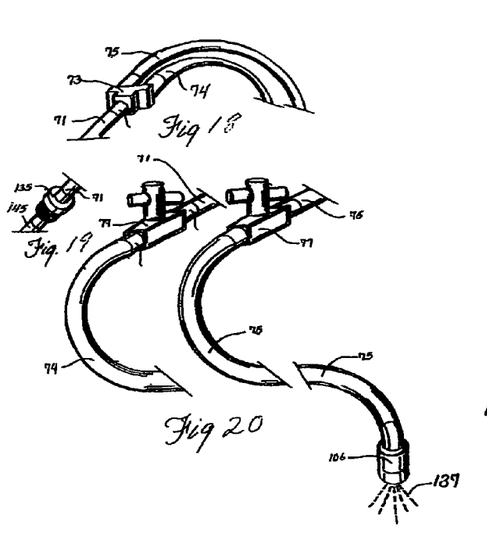
FIG. 18 shows a view of the water supply line showing how the water supply is separated into to parts using the splitter.
FIG. 19 shows a view of the water supply line using a garden hose if the water tank is not needed.
FIG. 20 shows a view of the water supply line to the dispenser and the free water line.
Figure 21:
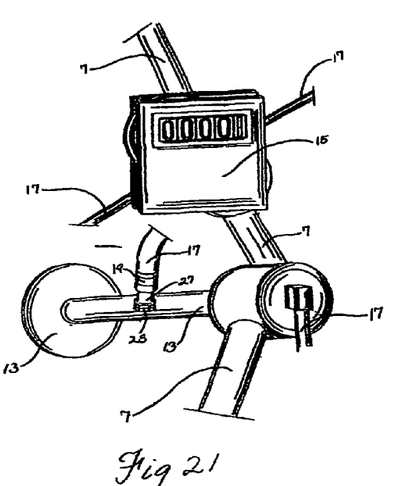
FIG. 21 shows a view of the reel axle and how the air travels from the air tank to the airline through the wheeled carriage, with a view of the distance meter mounted to the wheeled carriage.

The chemical dispenser 3, connected to the water supply line 71, has a splitter 73, dividing the water supply line 71, into two separate water lines, one is a free water supply line 75, and the other a water supply line to dispenser 74, as shown in FIG. 20, each line having a water on/off valve 77. The water supply line to dispenser 74, also has a splitter 73, having two nozzles 106, one facing in an upward position and the other in a downward position within the chemical dispenser 3, as shown in FIG. 1.

Figure 14:
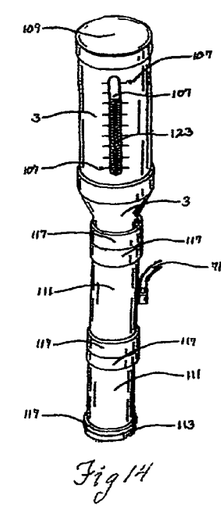
FIG. 14 shows a view of the fully equipped chemical dispenser with chemical and chemical dispenser bottom cap.
Figure 15:
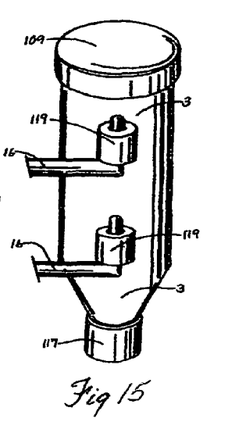
FIG. 15 shows a view of the chemical dispenser with the hanger for hanging the chemical dispenser to the wheeled carriage.
Figure 16:
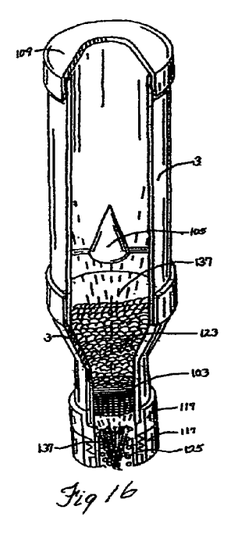
Figures 22, 23:
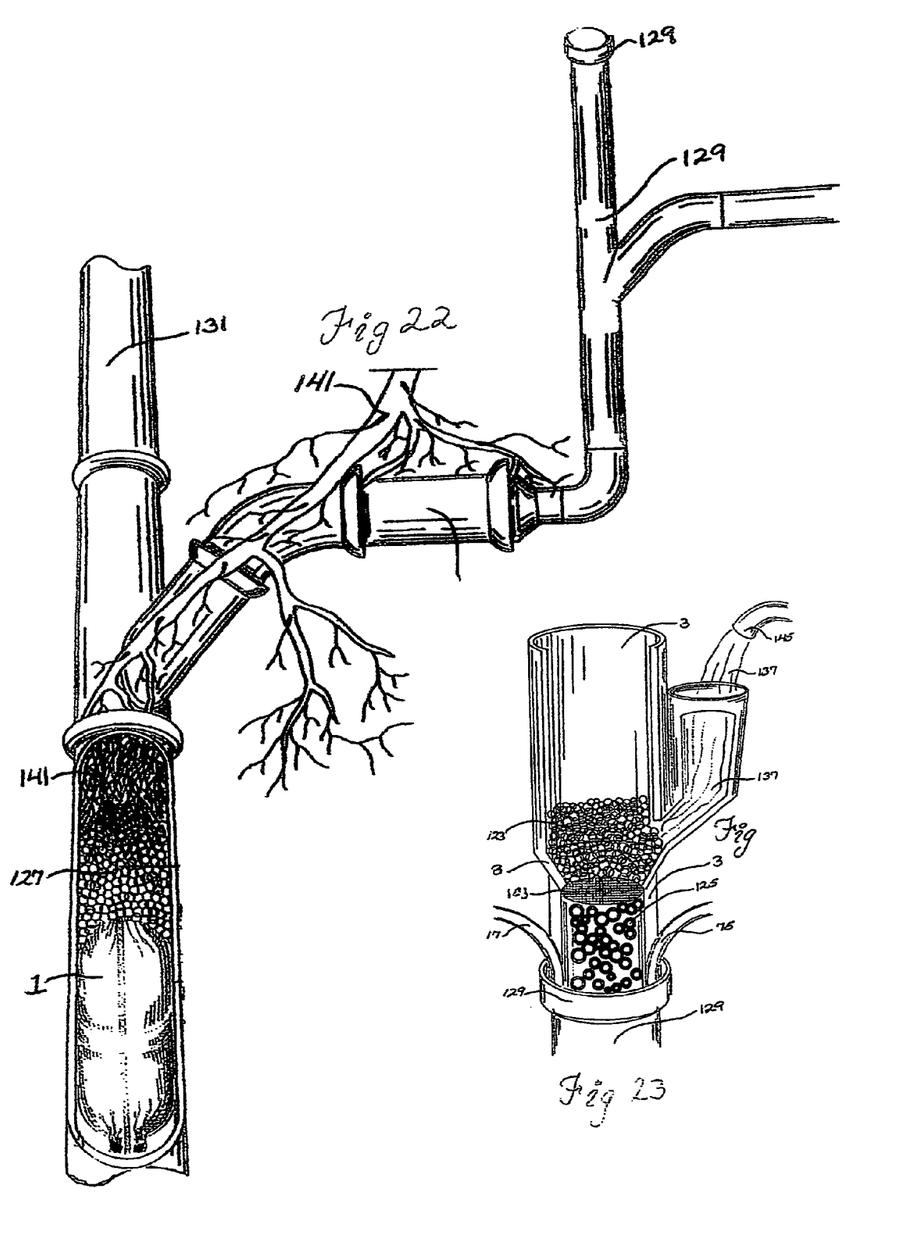
FIG. 22 shows an under ground top view of the main operation of the invention in the sewer system from a cleanout to a main sewer line, without the disruption of the sewer flow in the sewer system, while treating just the zone of the root problem.
FIG. 23 shows a side sectional view of the chemical dispenser in operation, within a cleanout.
Figure 24:
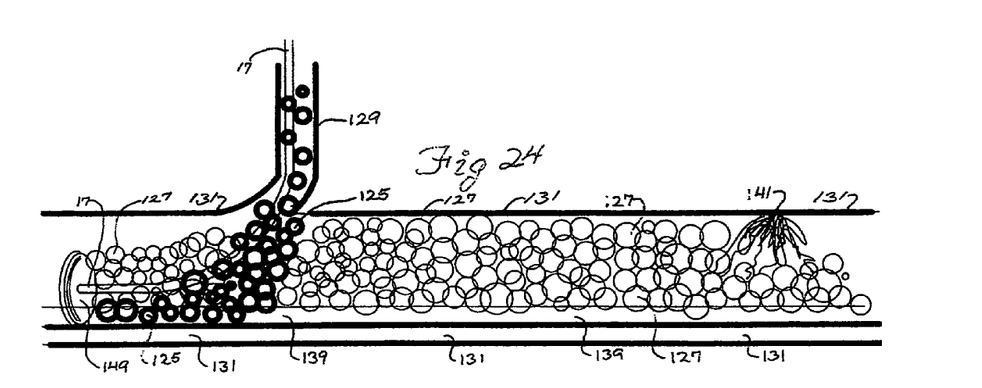
FIG. 24 shows an underground side sectional view of a root problem in a main sewer line, upstream from the entrance of a cleanout, showing how the root chemical works its way against the flow of the sewer water and treats the roots upstream from the entrance of treatment.

The chemical dispenser 3, is a cyclone shaped cylinder which can be disassembled for various maintenance and adjustment reasons, using dispenser connectors 117, as shown in FIGS. 14, 15, 16, 17. A screen 103, shield 105, a scale window 123, and lid 109, is located below the funnel section of cyclone just above the upward facing nozzle 106, is included to the chemical dispenser 3, a cone shaped shield 105, is mounted above the screen 103, a scale window 123, is locate at the side of the chemical dispenser 3, a lid 109 that closes the top of chemical dispenser 3, as shown in FIGS. 16,17. A chemical dispenser extension 111, as shown in FIGS. 14,17 extends the chemical dispenser 3, which extends into a sewer cleanout 129, or out of sewer manhole 133, as shown in FIGS. 23, 25.

DESCRIPTION OF THE OPERATION

The advantage of using my invention, is to activate a root chemical within the sewer system by applying water, and use the existing gravity flow of sewer water to transport the activated root chemical, to the specific zone. Once the activated chemical has traveled to the specific zone with the exiting sewer flow, a restrictor restricts the root chemical from flowing further downstream from with that specific zone without any disruption of the actual sewer flow. My invention is fully assembled as shown in FIGS. 1, 2.

Figure 4:
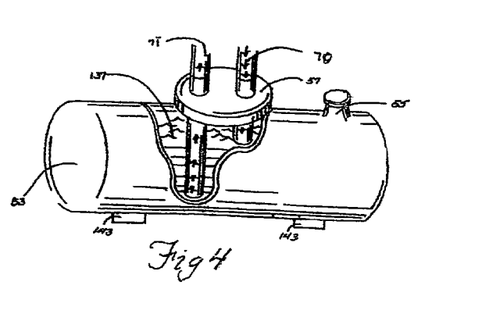
FIG. 4 shows a view of the water tank showing how the air supply produces a water flow.

The root treatment system is first prepared by filling the air tank 33, using air tank fill valve 37, as shown in FIG. 3, with compressed air and filling the water tank 53, using water tank fill cap 55, as shown in FIG. 4. The system is transported using the wheeled carriage 7, to the entrance of the sewer system. On the first treatment the root problem area may need to be inspected by using a sewer camera were a restrictor may be attached to the camera. If previous determination of the distance the roots are known the restrictor can be placed at the specific zone with no inspection needed. Once the distance is determined, the restrictor 1, is sent through the sewer entrance as shown in FIGS. 22,24, 25, 26, 27. Using the distance meter 15, or the distant markers 29, the expandable 1, is inserted to the desired distance downstream from the root problem.

The expandable restrictor 1, is then inflated by the operation of air fill valve 43, the regulator 41, will regulate the air pressure from air tank 17, which will prevent the expandable restrictor 1, of over inflation. The air flow meter 45, measures the volume of compressed air flow to the expandable restrictor 1, which gives the user a general idea when the expandable restrictor 1, will start expanding, the pressure gauge 47, allows the user to reassure that a full expansion has been reach and to regulate a full expansion should a deflation occur.

The protective braking bag 89, protects the expandable bladder 79, from foreign matter often found in the sewer system, and prevents the expandable bladder 79, from over inflating. The adjustable strap 93, allows the user to adjust the expandable bladder 79, if a full expansion is not desired and bag tie 95, secures the both ends of the protective braking bag 89, to the two plugs 83, and 85, zipper 97, allow the user to connect protective braking bag 89, to other sewer equipment to perform as a restrictor.

The sealed plug 83, and opened plug 85, closes both end of expandable bladder 79, as shown in FIG. 11. The opened plug 85, allow the passage of compressed air to the expandable bladder 79, while the sealed plug 83, restricts any passage of air causing the expandable bladder 79, to deflate. A non-expandable bladder sleeve 81, and zip ties 87, restricts the expanded section of the expandable bladder 79, both ends, which prevents disconnection and deflation of the expandable bladder 79.

The safety cable 21, and flanged sleeve 23, stiffens and secures the sealed plug 83, expandable bladder 79, opened plug 85, and grace air line 31, from separating. This also prevents any part of the root treatment system from disconnection while treatment is being performed, and allows a disconnection for maintenance. The grace airline 31, allows the user to change the expandable restrictor 1, without disassembling it, and to add an additional length to the actual distance desired, to reassure that the expandable restrictor 1, has past down stream from the roots being treated. The dummy restrictor 51, duplicates the size and inflation of expandable restrictor 1, outside of the sewer system.

Once the expandable restrictor 1, is in place and inflated, the chemical dispenser bottom cap 113, is placed on the bottom of chemical dispenser 3, to contain the root chemical 123, scale window 107, can be used to measure the volume of root chemical 123, if a desired length of treatment is desired. The chemical dispenser 3, is also used as a mixer to mix a two or more part chemical, by attaching lid 109, to the top of chemical dispenser 3, and turning in a top to bottom motion. Shield 105, shields the spray from nozzle 106, and contributes to the mixing. Once mixing is done the chemical dispenser bottom cap 113, is removed and chemical dispenser 3, is placed in the sewer entrance, screen 103, will hold root treatment chemical 123, and allow just the passage of water to activate the root chemical.

To start the treatment water tank air fill valve 63, is turned on to build pressure in water tank 53, the air pressure in water tank 53, will cause water 137, to flow to splitter 73, which will divide the water 137, into two separate water lines as shown in FIG. 18. One water supply line to dispenser 74 is connected to water on/off valve 77, is turned to the on position, which supplies water 137, to chemical dispenser 3, that exits nozzle 106, to activate root treatment chemical 123, as shown in FIGS. 16,17.

The free water supply line 75, is also turned on to produce a flow of water 137, in the sewer pipe 131, if no sewer water 139, is flowing at the time of treatment. A flow of water is need to transport the root chemical 123, to the specific zone, in most cases the main sewer line has an existing flow, so getting the chemical to the main sewer line should be sufficient, as shown in FIG. 22. The agitator 99, will produce an inflow turbulence which will enhance the maturity of the activated chemical 125, while the expandable restrictor 1, restrict matured chemical 127, from flowing past the specific zone and cause this build up to reach the top of larger pipes. The average gravity flow of a sewer is 2 feet per second, the chemical holds it's maturity for approximately 5-6 minutes, once the calculation of the time it would take the activated chemical 125, to travel to this distance the expandable restrictor 1, can be pulled back while the matured chemical 127, is still in it's mature stage covering a longer length of pipe if needed.

Once all root chemical 123, is displaced from chemical dispenser 3, water supply line to dispenser 74, is turned off, the free water supply line 75, is used to rinse the equipment while still in the sewer. Once this is completed, the air is released from expandable restrictor 1, by the pressure release valve 49, to deflate the expandable restrictor 1, and air supply line 17, is wound back in to revolving reel 11.

While I have shown and described in considerable detail what I consider to be the preferred form of my invention, it will be understood by those skilled in the art that various changes may be made in the shape and arrangement of the several parts of the device, and that such details are not intended to limit the scope of my claims.

CONCLUSION, RAMIFICATIONS, AND SCOPE OF INVENTION

Thus the reader will see that the root treatment system of the invention provides a highly reliable, lightweight, and economical way to treat roots that has entered under ground pipe's that can be used by persons in the field of sewers.

While my above description contains much specificity these should not construed as limitations on the scope of the invention, but rather as an exemplification of one preferred embodiment thereof. Many other variations are possible. For example:

The restrictor can be made of various materials, shapes, and size, other materials can be as simple as a bread bag or made of in a shape as shown if FIG. 2 And connected to other sewer equipment as shown in FIGS. 1, 24, 26, 27. The air supply line can be eliminated and cable can be used to transport the restrictor if expansion is not required. FIG. 2 is a perfect example of the simplicity of the root treatment system. The restrictor and dispenser doesn't necessarily have to be at the same entrance of the sewer they can be detached at two separate entrances to treat a whole length of pipe where multiple root concerns accrue, the main purpose of the dispenser is to liquefy the chemical to travel under the roots and work its way back up stream being that roots tend to grow in the direction of the sewer flow which makes it impossible to cover both sides of the root using the dumping method. The parachute could be eliminated, but the parachute can help pull the restrictor for long distance and parachute could actually be a restrictor being that just a slight restriction will cause the chemical to foam. and the chemical it self becomes it own restrictor and hold back the rest of the chemical from flowing down stream.

There are many ways that the system can be rearranged, for example: the chemical dispenser extension 111 can be connected to the chemical dispenser in many different ways to have many different advantages, such as being used as a shoot to fill the chemical dispenser from ground level not shown in FIG. 25, in FIG. 2 the expandable restrictor 1, be connected to a handle when placing the expandable restrictor 1, in a manhole.

The portable non-disruption of sewer flow root treatment system for the elimination of roots in the sewer system, uses the existing flow of the sewer system to transport an efficient amount of a foaming root chemical needed to treat a desired zone of pipe, the efficient amount of root chemical is brought to a consistency to travel via route of the existing sewer flow, to a location to be treated for the elimination of roots in the sewer system, without plugging the pipe and stopping the sewer flow.

Many modifications and other embodiments of the invention will come to mind to one skilled in the art to which this invention pertains having the benefit of the teaching presented in the foregoing description and the associated drawings. Therefore, it is to be understood that the invention is not to be limited to the specific embodiments disclosed and that modification and other embodiments are intended to be included within the scope of the appended claims. Although specific terms are employed herein, they are used in a generic and descriptive sense only and not for the purposes of limitation.

What I claim as my invention is:

1. A portable non-disruption of sewer flow root treatment system for the elimination of roots in the sewer system that uses an existing flow of a sewer system to transport an efficient amount of a foaming root chemical needed to treat a desired zone of a pipe, wherein the efficient amount of root chemical is brought to a consistency to travel via route of the existing sewer flow to a location to be treated for the elimination of roots in the sewer system without plugging the pipe and stopping the sewer flow, the portable non-disruption of sewer flow root treatment system comprising:

a) an expandable restrictor capable of entering a smaller diameter pipe than that being treated, wherein the expandable restrictor includes a protective braking bag with at least one adjustable strap that controls and varies the expansion size of the expandable restrictor, wherein the expandable restrictor travels under the roots in the pipe then expands but does not fill the entire circumference of the pipe and floats on the existing flow of the sewer system, thereby allowing the flow of the sewer system to travel and only restricts the foam of the root chemical from flowing further downstream of the desired zone that needs treatment, wherein the expandable restrictor is interchangeable with a conventional basic restrictor, attachable to other equipment used in sewers, and is capable of being positioned in a downstream sewer manhole; and b) a root chemical dispenser for dispensing the root chemical into the sewer system; wherein the root chemical dispenser receives a source of water to activate the root chemical to a consistency to travel in the sewer system via sewer flow to the desired zone of the pipe where the expandable restrictor is floatably positioned.

2. A portable non-disruption of sewer flow root treatment system for the elimination of roots in the sewer system and alike as defined in claim 1, further comprising a wheeled carriage including a water and air tank, which uses a network of gauges and valves with water and airlines for the operation of the expandable restrictor and the root chemical dispenser for the distribution of a desired consistency of the root chemical which allows the foam produced by the root chemical to travel under roots via sewer flow with out plugging the pipe being treated or stopping the sewer flow.

3. A portable non-disruption of sewer flow root treatment system for the elimination of roots in the sewer system as defined in claim 2, wherein the wheeled carriage further includes a revolving reel that stores an air line with distance markers, wherein one end of the air line is connected to the network of gauges and a dummy restrictor which provides an above ground view, wherein the dummy restrictor duplicates the actual expansion of the expandable restrictor to reassure the dimension of the expansion of the expandable restrictor to prevent plugging the pipe being treated, and wherein the other end of said air line is connected to the said expandable restrictor which allows the expandable restrictor to travel through the sewer pipes and places the expandable restrictor downstream of the roots being treated.

4. A portable non-disruption of sewer flow root treatment system for the elimination of roots in the sewer system as defined in claim 3, wherein the expandable restrictor comprises an expandable and retractable bladder in connection to the air line, wherein the bladder expands the protective braking bag, and the protective braking bag controls the diameter of the expansion and thereby prevents plugging and sealing the pipe and wear and tear of the expandable and retractable bladder; wherein a first sled is positioned at the front of said expandable and retractable bladder to contain the air that expands the expandable and retractable bladder, and a second sled is positioned at the rear of said expandable and retractable bladder that allows the passage of air into, and contains the air within, the expandable and retractable bladder, and to lessen restriction when traveling through bends in the sewer system, the sleds are connected together by a stiffening safety cable to keep the expandable restrictor firm when traveling through bends in case of damage and to control the length of the expansion of the expandable restrictor.

5. A portable non-disruption of sewer flow root treatment system for the elimination of roots in the sewer system as defined in claim 4, wherein the braking bag covers the entire expandable and retractable bladder for braking the expandable and retractable bladder from being over inflated and for protecting the expandable and retractable bladder from foreign objects when the bladder has entered the sewer system.

6. A portable non-disruption of sewer flow root treatment system for the elimination of roots in the sewer system as defined in claim 4, wherein the at least one adjustable strap runs along the circumference of said expandable and retractable bladder for expansion when the bladder is inflated, and for retraction of the braking bag when the bladder is deflated.

7. A portable non-disruption of sewer flow root treatment system for the elimination of roots in the sewer system as defined in claim 1, wherein the root chemical dispenser further comprises multiple openings and containing means for receiving and dispensing a source of water and root chemical; a screen to support the root chemical and only allow water a passage to activate the root chemical to a consistency that allows the root chemical to travel to the expandable restrictor using the existing flow of the sewer system, wherein the water is capable of being applied by gravity or pressure; a means to regulate the water; a window having a scale of measurement to regulate the volume of root chemical and water ratio for acquiring a desired consistency of the root chemical; and an outlet to create a gravity flow when the root chemical is dispensed.

8. A portable non-disruption of sewer flow root treatment system for the elimination of roots in the sewer system as defined in claim 7, wherein the screen is positioned in a degree from horizontal to a vertical.

9. A portable non-disruption of sewer flow root treatment system for the elimination of roots in the sewer system as defined in claim 1, wherein the at least one adjustable strap is capable of quickly adjusting the size of the expansion of the expandable and retractable bladder to a fit various pipe sizes of the sewer system.

10. A portable non-disruption of sewer flow root treatment system for the elimination of roots in the sewer system as defined in claim 1, wherein the chemical dispenser comprises a cyclone shaped cylinder which can be disassembled using dispenser connectors.

11. A portable non-disruption of sewer flow root treatment system for the elimination of roots in the sewer system as defined in claim 1, further comprising a parachute to help transport the restrictor to the desired zone over long distances, and an agitator to enhance the root chemical to maturity once the existing sewer water flow transports the activated root chemical to the desired zone.

12. A portable non-disruption of sewer flow root treatment system for the elimination of roots in the sewer system as defined in claim 1, further comprising a drop line connected to the chemical dispenser.

13. A portable non-disruption of sewer flow root treatment system for the elimination of roots in the sewer system as defined in claim 1, wherein the expandable restrictor is capable of being pulled back while the matured root chemical is in a mature stage.

14. A portable non-disruption of sewer flow root treatment system for the elimination of roots in the sewer system as defined in claim 1, wherein the chemical dispenser further comprises a chemical dispenser extension which is capable of extending from an end of the chemical dispenser into a sewer cleanout or a sewer manhole or used as a shoot to fill the dispenser with chemical.

* * * * *